F. J. UNDERWOOD.
Cultivator Coupling.
No. 85,412.
Patented Dec. 29, 1868.
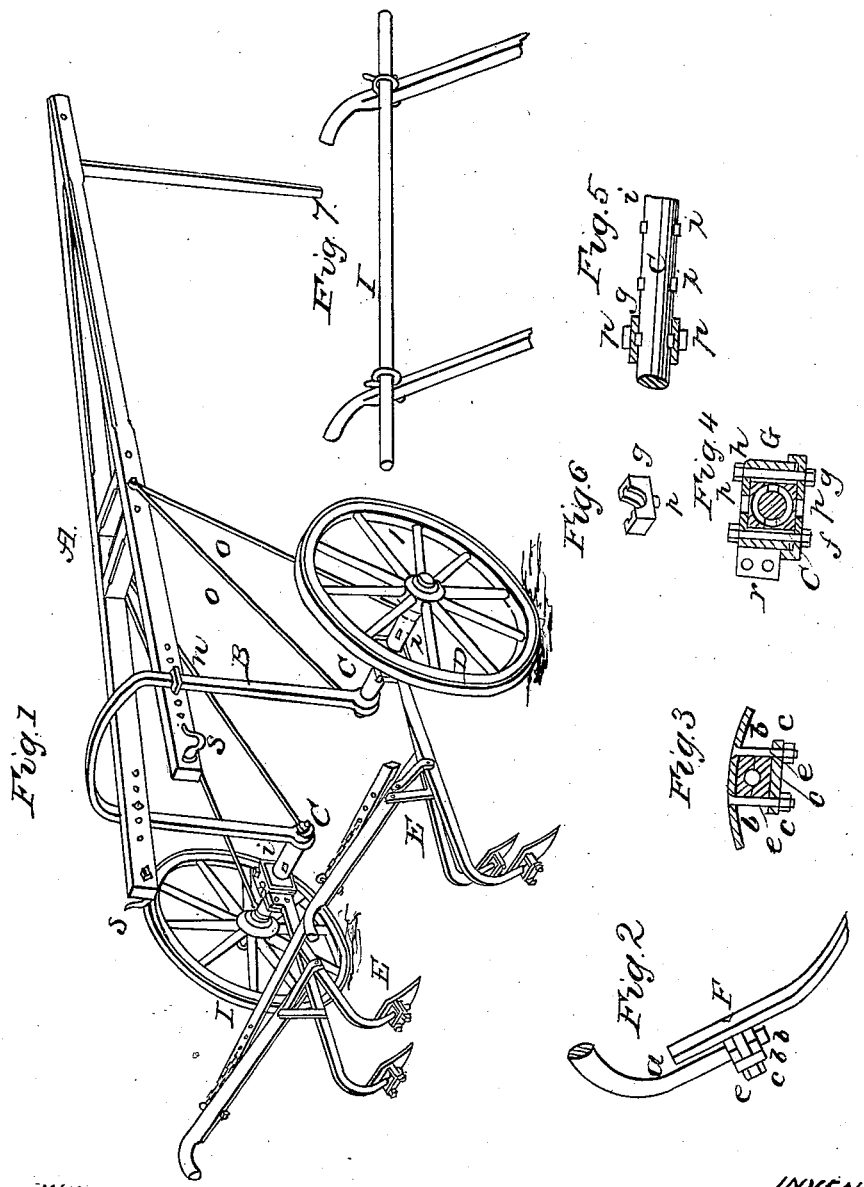
WITNESSES
P. F. Dodge
L. Hailer
INVENTOR
F. J. Underwood
by Dodge & Munn
his atty

UNITED STATES PATENT OFFICE.

F. J. UNDERWOOD, OF ROCK ISLAND, ILLINOIS, ASSIGNOR TO B. D. BUFORD, OF SAME PLACE.

IMPROVEMENT IN CULTIVATORS.

Specification forming part of Letters Patent No. 85,412, dated December 29, 1868.

*To all whom it may concern:*

Be it known that I, FLAVIUS J. UNDERWOOD, of Rock Island, in the county of Rock Island and State of Illinois, have invented certain new and useful Improvements in Walking-Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to an improved corn-cultivator of that class denominated "walking-cultivators," in which the horses are attached to a frame mounted upon two wheels, and to the rear of which frame are secured the plows, the operator walking behind and managing them.

My improvement relates especially to the manner of attaching the shovels to the beam of the plow, and of connecting the plows to the frame of the machine; also, in coupling the two plows together.

In the drawings, Figure 1 is a perspective view of the machine complete in position to operate; Fig. 2, a side view of a portion of one of the plow-beams, showing the manner of attaching the shovels; Fig. 3, a cross-section of the same; Fig. 4, a longitudinal vertical section through the head or joint by which the plows are attached to the frame of the machine; Fig. 5, a longitudinal vertical section of the same; Fig. 6, a part of same detached, and Fig. 7 a perspective view of a coupling for connecting the plows one with another.

In constructing my machine I make a strong wooden frame, A, of any suitable width at the rear end, but coming to a point at the front end, so as to form a tongue. Near the rear end of this frame A, I attach vertically to it the strong wrought-iron frame B, shaped like an inverted letter U. This frame straddles the frame A, and is held in position by the clamps *n*, which clasp over it, and one arm of which extends through the frame A, and is held by nuts on the inside, as shown in Fig. 1. This frame B may be adjusted backward or forward on the frame A by moving the clamps to another of the series of holes in the frame provided for that purpose.

To the ends of the frame B, which extend down a considerable distance below the frame A, I attach the outwardly-extending axles C, to the outer ends of which are attached the main wheels D of the machine, the axles being secured to the metal frame by passing through it, and having a nut on the inside, the axles having shoulders on the outside of frame B, and being braced by the rods *o o*, attached one at the inner and one at the outer end of each axle, and both running forward and being fastened to the frame A, all as shown in Fig. 1. To the said axles C are attached the plows E by the joints or couplings G, which are constructed in such a manner that the rear ends of the plows may be moved laterally and vertically as far as desired. These joints each consist of a pair of boxes, *g*, which fit upon the axle, and are prevented from moving laterally by studs *i* upon the axle, which play in grooves on the inner faces of the boxes, as shown in Figs. 4, 5, and 6, each of the boxes having upon its back a round stud, *p*, and being held in place upon the axle by a square metal frame, *h*, made in two parts, and held together by the bolts *f*, the whole frame turning upon the studs *p*, which pass through holes in the frame *h*, as shown in Fig. 4. The joints thus constructed allow the plows to be moved from side to side or lifted entirely out of the ground, while firmly holding them in an upright position. There are upon the axle several pairs of the studs *i* at short distance apart, as shown in Fig. 5, so that the plows may be adjusted to plow any desired distance apart.

The manner of attaching the shovels is clearly shown in Figs. 2 and 3, the lower ends of the beams being round, and each shovel having boxes *b b* secured to its back by the bolts *e e* and plate *c* in such a manner that by turning up the nuts on the bolts the brasses will be clamped tightly upon the beam and hold the shovel in any position in which it may have been placed. By simply loosening the nuts on the bolts *e*, the shovel may be adjusted either laterally upon the beam or up or down, as occasion requires.

The plows E, I connect by a light wooden bar, I, attached to the handles near their upper ends by short chains, as shown in Fig. 1, the object of this connection being to enable the operator to manage both plows by simply grasping the handle of one, the chains at the same time allowing the plows to be moved independently of each other far enough to conform to any slight irregularities there may be in the rows of corn. The bar I is provided with a series of holes, so as to adjust the chains to correspond to the adjustment of the plows.

Instead of connecting the bar I to the plows by chains, it may be passed through rings or eyes secured to the handles and held in place by pins, as shown in Fig. 7, and may be adjusted by placing the pins in any of the series of holes in the bar.

A hook, s, is provided at the rear end of the frame A, on each side, upon which the plows are suspended when the implement is being conveyed to and from the field.

Having thus described my invention, what I claim is—

1. The cultivator-frame, consisting of the bars A and the bent bar B, with the axles C attached, the part A being made adjustable, substantially as shown and described.

2. The manner of attaching the plows to the axle C by means of the plates $h$, grooved boxes $g$, and studs or pins $i$, all constructed and arranged to operate as described.

3. The shovels F, provided with the boxes $b$, bolts $e$, and bar $c$, in combination with the rounded shank $a$ of the plow-beam, whereby the shovels are rendered capable of being adjusted and secured in place, substantially as herein described.

4. Connecting the handles of the two sets of cultivator-shares by means of the bar I, when so arranged as to limit the distance to which said handles may move apart, and yet leave them free to approach each other, substantially as shown and described.

F. J. UNDERWOOD.

Witnesses:
HENRY CURTIS, Jr.,
E. H. BOWERS.